US 012417561B2

(12) United States Patent
Saad et al.

(10) Patent No.: US 12,417,561 B2
(45) Date of Patent: Sep. 16, 2025

(54) PARAMETER-BASED SYNTHETIC MODEL GENERATION AND RECOMMENDATIONS

(71) Applicant: Adobe Inc., San Jose, CA (US)

(72) Inventors: Michele Saad, Austin, TX (US); Ajay Jain, San Jose, CA (US)

(73) Assignee: Adobe Inc., San Jose, CA (US)

( * ) Notice: Subject to any disclaimer, the term of this patent is extended or adjusted under 35 U.S.C. 154(b) by 197 days.

(21) Appl. No.: 18/128,906

(22) Filed: Mar. 30, 2023

(65) Prior Publication Data

US 2024/0331210 A1 Oct. 3, 2024

(51) Int. Cl.
| | | |
|---|---|---|
| G06T 11/00 | (2006.01) | |
| G06N 3/045 | (2023.01) | |
| G06N 3/0475 | (2023.01) | |
| G06N 3/094 | (2023.01) | |
| G06Q 30/0601 | (2023.01) | |
| G06Q 50/00 | (2024.01) | |

(52) U.S. Cl.
CPC .............. G06T 11/00 (2013.01); G06N 3/045 (2023.01); G06N 3/0475 (2023.01); G06N 3/094 (2023.01); G06Q 30/0631 (2013.01); G06Q 50/01 (2013.01)

(58) Field of Classification Search
CPC .... G06Q 50/01; G06Q 30/0631; G06T 11/00; G06N 3/094; G06N 3/088; G06N 7/01; G06N 3/0475; G06N 3/047; G06N 20/00; G06N 3/045
USPC ........................................................ 345/418
See application file for complete search history.

(56) References Cited

U.S. PATENT DOCUMENTS

| 12,093,983 | B2 * | 9/2024 | Flinn .................. G06Q 30/0269 |
| 2013/0055097 | A1 * | 2/2013 | Soroca ............... G06Q 30/0246 |
| | | | 715/738 |
| 2020/0184278 | A1 * | 6/2020 | Zadeh .................... G06N 3/044 |
| 2021/0399911 | A1 * | 12/2021 | Jorasch ............... H04L 12/1818 |

(Continued)

OTHER PUBLICATIONS

Xia L, Huang C, Xu Y, Dai P, Bo L. Multi-behavior graph neural networks for recommender system. IEEE Transactions on Neural Networks and Learning Systems. Oct. 19, 2022;35(4):5473-87.*

(Continued)

*Primary Examiner* — Phu K Nguyen
(74) *Attorney, Agent, or Firm* — Kilpatrick Townsend & Stockton LLP

(57) ABSTRACT

Some embodiments described herein relate to systems and methods for parameter-based synthetic model generation and recommendations including an image generation module and a recommendation module. The image generation module can receive one or more parameters and, responsive to receive the one or more parameters, generate a parameterized image using a generative machine learning model. The generative ML model may use the parameters as a seed for generating the parameterized image. The recommendation module may generate a first set of recommendations for a user of the client device and receive the one or more parameters. The recommendation module may determine, based on the one or more parameters, a second set of recommendations for the user of the client device. The second set of recommendations may include at least one element from the first set of recommendations.

20 Claims, 7 Drawing Sheets

(56) References Cited

U.S. PATENT DOCUMENTS

2023/0077948 A1* 3/2023 Jackson ............ G06Q 30/0271
709/206

OTHER PUBLICATIONS

Kulkarni S, Rodd SF. Context Aware Recommendation Systems: A review of the state of the art techniques. Computer Science Review. Aug. 1, 2020;37:100255.*

Roh JH, Jin S. Personalized advertisement recommendation system based on user profile in the smart phone. In2012 14th International Conference on Advanced Communication Technology (ICACT) Feb. 19, 2012 (pp. 1300-1303). IEEE.*

Alhalabi M, Hussein N, Khan E, Habash O, Yousaf J, Ghazal M. Sustainable smart advertisement display using deep age and gender recognition. In2021 International Conference on Decision Aid Sciences and Application (DASA) Dec. 7, 2021 (pp. 33-37). IEEE.*

Viktoratos I, Tsadiras A. Personalized advertising computational techniques: A systematic literature review, findings, and a design framework. Information. Nov. 19, 2021;12(11):480.*

Anchanto, "8 E-commerce Challenges Tech Can Solve in the Fashion and Apparel Industry", Available online at https://www.anchanto.com/8-ecommerce-challenges-tech-can-solve-in-the-fashion-and-apparel-industry/, 2023, pp. 1-12.

The Gap Inc., "Gap", https://www.gap.com/browse/product.do?pid=241908032&rrec=true&mlink=5001%2C1%2Cdivision_gapdivision1_rr_0&clink=1#pdp-page-content, 2023, pp. 1-8.

Brouton Lab, "Three Cool Applications of GANS in eCommerce", Available online at https://broutonlab.com/blog/applications-of-gans-in-ecommerce, 2017, pp. 1-13.

* cited by examiner

PARAMETER-BASED SYNTHETIC MODEL GENERATION AND RECOMMENDATIONS

TECHNICAL FIELD

This disclosure generally relates to machine learning and, more specifically, to parameter-based synthetic model generation and recommendations.

BACKGROUND

Marketing materials often contain images of human models. One challenge faced by developers of such content is that the human models displayed are static and may therefore only appeal to a limited demographic segment of the population. Marketers may try to ensure that a variety of models appear in published materials, so as to appeal to a wide variety of demographic preferences and tastes. However, creating a diverse set of content manually is expensive, time consuming, and does not scale. Moreover, there are often new dimensions that might be of interest to users that may not be accounted for even when the product images are shown on a diverse set of human models.

Likewise, recommendation engines can provide recommendations to users, such as recommendations for products, services, and other items that may be of interest to the users. Recommendations can be generated based on aggregate user profiles developed over time using observed user behaviors. Such recommendations are typically made by comparison to of potential products, services, and other items with similar products, services, and other items indicated in a user's profile or by comparison of the user to other users with similar behaviors and buying habits. These recommendations may not account for unique preferences and tastes of the individual user for whom they are generated.

SUMMARY

Some embodiments described herein relate to systems and methods for parameter-based synthetic model generation and recommendations, in which an image generation module receives one or more parameters and generates a parameterized image using a generative machine learning model, wherein the one or more parameters are used as a seed by the generative machine learning model. The image generation module outputs the parameterized image to a client device. In some embodiments, a recommendation module generates a first set of recommendations for a user of the client device. The recommendation module receives the one or more parameters and determines, based on the one or more parameters, a second set of recommendations for the user of the client device. The second set of recommendations includes at least one element recommendation from the first set of recommendations. The recommendation module outputs the second set of recommendations to the client device.

In some embodiments, the one or more parameters includes a parameter selected by the user of the client device. In some other embodiments, the one or more parameters includes a parameter generated by a machine learning model and inferred from a behavior of the user of the client device. In still other embodiments, the one or more parameters includes a first parameter selected by the user of the client device and a second parameter generated by a machine learning model and inferred from a behavior of the user of the client device.

In some embodiments, a behavior analysis module determines from a behavior of the user of the client device, a behavioral metric of the user. The image generation module uses the behavioral metric as another seed for the generative machine learning model to generate the parameterized image.

In some embodiments, the behavior analysis module determines a first behavioral metric from a behavior of a first user of a first client device and determines a second behavioral metric from a behavior of a second user of a second client device. The behavior analysis module generates, using the first behavioral metric and the second behavioral metric, a similarity measure between the first user and the second user. The behavior analysis module determines, from the similarity measure, one or more parameters for the second user. The image generation module generates a second parameterized image using the generative machine learning model, wherein the one or more parameters for the second user are used as a second seed for the generative machine learning model to generate the second parameterized image. The image generation module outputs the second parameterized image to the second client device.

In some embodiments, a behavior analysis module determines first and second behavioral metrics from a first and second behavior of the user of a client device. The behavior analysis module determines, using a reinforcement learning model, a behavior pattern from the first behavioral metric and the second behavioral metric. The behavior analysis module determines, from the behavior pattern, one or more parameters for the user. The image generation module generates a second parameterized image using the generative machine learning model, wherein the one or more parameters for the user are used as a second seed for the generative machine learning model to generate the second parameterized image and output the second parameterized image to the client device.

In some embodiments, the second set of recommendations is determined using at least one of a behavioral segmentation algorithm, a content-based filtering algorithm, or a collaborative filtering algorithm. In some other embodiments, the first set of recommendations for the user of the client device are based on the behavior of the user of the client device. In still other embodiments, the first set of recommendations is ranked by the recommendation module and the second set of recommendations for the user of the client device is re-ranked, based on the one or more parameters.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
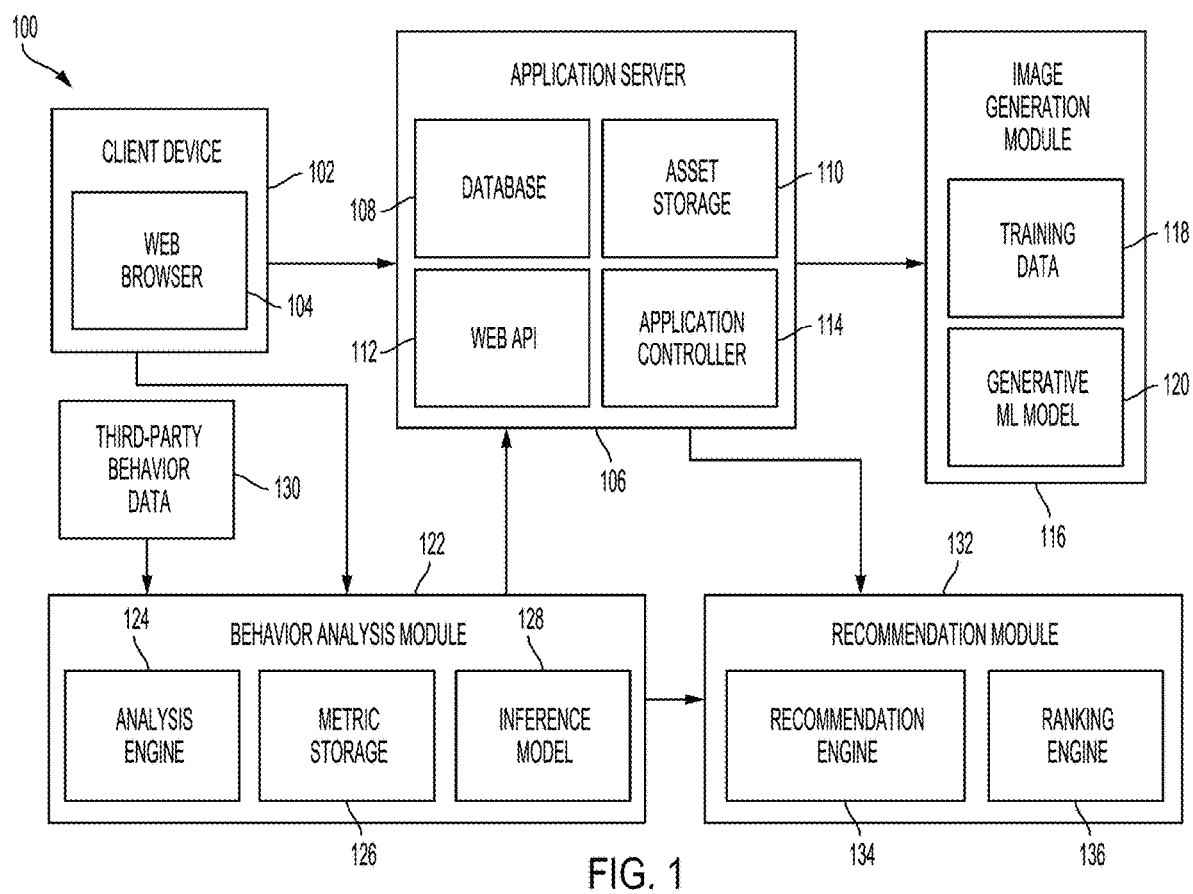
FIG. 1 is a diagram of an example synthetic image generation system for parameter-based synthetic model generation and recommendations, according to some embodiments described herein.

Creators of marketing materials carefully craft web-based content with the goal of maximizing conversion rates. The conversion rate, or the fraction of website visitors that ultimately make a purchase, is closely correlated with the volume of traffic that the store draws as well as the appeal of the product offerings. On the other hand, vendors strive to control costs by minimizing the rate of product returns. Indeed, the fashion and apparel industry have a high return rate compared with some other industries.

In many cases, fashion and apparel merchandise is marketed or advertised using human models. This approach allows marketing content creators to showcase a sample of their apparel to attract users to their product pages as well as to help users visualize the apparel or other products. Traditionally, marketing content creators with limited budgets and constrained ability to customize visual displays may show their product offerings using a limited number of human models with physical characteristics intended to appeal to the broadest possible demographic audience. For example, the creator of a web-based advertisement may create a display including one female model with a light skin tone wearing a green shirt with a medium size. Another traditional approach involves using digital imaging technologies to superimpose different colors, styles, fits, etc. of the same apparel on the same model.

Such traditional approaches may target an average effectiveness of the marketing material, given limited space and budget. But such products are available in a large variety of sizes and attributes, and each website visitor may have a unique set of physical attributes (e.g., body shape, size, skin tone, ethnicity, etc.). A model with the same or substantially similar features might help a website visitor better visualize and determine the desirability of selected items. Thus, a limited number of human models with a limited number of physical characteristics artificially constrains the user's ability to visualize how the marketed products will appear given their own unique physical characteristics. Marketers may try to ensure that a variety of models appear in their published materials that appeal to a wide variety of demographic preferences and tastes. However, creating this diverse set of content manually is expensive, time consuming, and does not scale. Moreover, there are constantly new dimensions that might be of interest to users that may not be accounted for even when the product images are modeled on a diverse set of models.

Closely related to the generation of marketing material is the output of recommendation technologies. Websites marketing products for purchase typically provide recommendations for additional products, for example, alongside the product being viewed. Such technologies may use content-based filters, which recommend based on attributes of the product being viewed. In some examples, they may use collaborative-filtering, in which the recommendations are based on similarities to the particular website visitor. Traditionally, a visitor to a website may be served recommendations that are relevant on average. Traditional recommendation systems optimize the average effectiveness of the recommendations served. However, like with the problems related to the presentation of a static set of human models discussed above, there are unique dimensions that are left unaccounted for by these generic traditional recommendation systems. These recommendations may not account for the unique preferences and tastes of the individual user who received them.

The present disclosure describes systems and methods for parameter-based synthetic model generation and recommendations that account for user input and implicit user behavioral data by adjusting web-based marketing content, including graphics, photos, video, and other forms of multimedia. The disclosed system and methods use generative machine learning (ML) for synthetic model generation in a manner that allows users to manually specify parameters of interest to seed generative ML algorithms, infer parameters of interest from behavioral data, determine optimal parameters of interest, extrapolate parameters to other users, or generate highly relevant product recommendations.

In an example implementation, a method for parameter-based synthetic model generation and recommendations includes receiving, by an image generation module, one or more parameters. For instance, a website may be used for marketing a sweater available in a variety of colors and sizes. The business operating the website desires to reach the broadest possible audience with their marketing content to maximize the conversion rates of website visitors. The sweater may be presented among related marketing content, including a human model wearing the sweater. A particular user may desire to see the sweater on a model whose appearance more closely resembles their own or according to some other preference (e.g., the traits of a person for whom the sweater might be purchased as a gift). The website may provide several graphical user interface ("GUI") elements for the input of parameters in the form of structured or unstructured data. For example, the GUI elements may include a slider for selecting skin tone, radio buttons for selecting ethnicity, or a text input box for inputting size, among many other possibilities. The particular user may use the controls to select the skin tone, ethnicity, and size corresponding to their own preferences, as well as input arbitrary, unstructured text that specifies preferences. The particular user's selections may be sent as parameters to the image generation module.

The image generation module may generate a parameterized image using a generative machine learning ("ML") model, in which the one or more parameters are used as a seed by the generative ML model for generating the parameterized image representing a synthetic model. The image generation module may add the generated synthetic model to the sweater product page of the website being viewed by the particular user.

Based on the user's interest in the sweater, a recommendation module may generate a first set of recommendations for the user, for example one or more recommended similar sweaters. The recommendation module can also receive the one or more parameters and use those as inputs to determine a second set of recommendations for the user. In some cases, the second set of recommendations may include one or more elements from the first set of recommendations. For instance, the recommendation module may, based the user's selections for skin tone, ethnicity, and size, provide additional or different recommendations and/or change the order of the first set of recommendations such that highly relevant recommendations may be generated.

The systems and methods disclosed herein for parameter-based synthetic model generation and recommendations constitute improvements to the technical field of digital marketing content generation and to systems for synthetic human model generation. In particular, marketing content creators benefit from an automated, robust, and scalable mechanism through which they can enable a user to visualize products on fashion models with attributes to their liking. Moreover, the ability to infer parameters for users and provide relevant recommendations can reduce the need for expensive computational overhead associated with repeated generation of synthetic models based on trial and error.

Although the description and examples above are given in the context of fashion or apparel, it will be apparent to one skilled in the art that the methods of the present disclosure are applicable to any context that includes a user of a client device viewing a displayed item, who may have preferences about that item. For example, embodiments of the present disclosure may be used for generation of images of customizable user goods like furniture, kitchen ware, vehicles, and food, among many other possible examples. Moreover, it should be stressed that the methods of the present disclosure are applicable outside the context of e-commerce or retail, as well as other multimedia formats including graphics, photos, and/or video. For example, the methods of the present disclosure may be used for generation of images for gaming, augmented reality, virtual reality, mixed reality, educational, narrative, expositive, or argumentative purposes, among other possible uses, in addition to the examples shown herein.

As used herein, the term "machine learning model" is a set of software instructions that can be used to recognize patterns in data and make predictions based on the data through a training or learning process. The machine learning model can be trained for these tasks using supervised learning techniques, using a dataset that is labeled, or unsupervised learning techniques, in which the details of the dataset are unknown.

As used herein, the term "generative machine learning model" refers to a subclass of machine learning models that can be used to generate new data. Typically, generative machine learning models are trained using a dataset similar to the desired output and then are input either random data or data related to the desired output to achieve the desired output. Common generative machine learning models include generative adversarial networks (GANs) and diffusion models. Generative machine learning models can receive input in a variety of forms, including plain text.

As used herein, the term "parameters" refers to a set of inputs to a generative machine learning model used to generate a given output. The term "parameterized" refers to the generated output that incorporates some or all of the input parameters. For example, if a text-to-image machine learning model is to generate an image of a car, the image could be parameterized using parameters such as adjectives like "large," "red," and "sedan."

As used herein, the term "seed" refers a particular set of parameters passed to a generative machine learning model. For example, if a text-to-image generative machine learning model is input a "a car that is a large red sedan," the phrase "a car that is a large red sedan" may be said to be the seed for the generation of a corresponding image.

As used herein, the term "synthetic model" refers to an image generated by a generative machine learning model for the purposes of marketing a product. For example, a webpage may showcase a sweater worn by a model. The model can be a photograph of a human wearing the sweater, or it can be a generated synthetic model, which is an image generated by a generative machine learning model of an apparently human person wearing the sweater. However, the apparent human in the image of the synthetic model does not exist. Rather, it is an amalgam or extension of the data used to train the generative machine learning model. A synthetic model is typically an image of a model person, animal, or object. The model may, for example, demonstrate the wearing an article of clothing or some interacting with an object (or another object). In contrast, a synthetic image more generally refers to any parameterized image.

As used herein, the term "similarity measure" refers a mathematical measure of closeness or similarity between two elements in a particular representation. For example, if two product preferences were represented as points in a three-dimensional space, in which each dimension corresponds to a preference, like color or size, a simple similarity measure may be the Euclidean distance between the two points. Other similarity measures include vector representations in which the cosine or dot product may be used.

As used herein, the term "reinforcement learning model" refers to a type of machine learning model including a specified environment and an agent operating in that environment that learns by algorithmically acting in the environment and changing behavior response to those actions in order to solve an optimization problem. Many environments used in reinforcement learning models are described using a Markov Decision Process including a specified finite number of states, actions, and outcomes.

FIG. 1 is a diagram of an example synthetic image generation system 100 for parameter-based synthetic model generation and recommendations, according to some embodiments described herein. The components of the synthetic image generation system 100 depicted in FIG. 1 may be implemented in software executed by one or more processing units of a computing system, implemented in hardware, or implemented as a combination of software and hardware. FIG. 1 depicts components in a particular configuration, but many other configurations are possible. For example, all components from example synthetic image generation system 100 may run in a single administered hardware server or some or all components may be run using computing resources of one or more cloud infrastructure providers.

As will be discussed in detail, synthetic image generation system 100 includes at least an image generation module 116, a behavior analysis module 122, and a recommendation module 132. The image generation module 116 may be a software program that can use generative ML technology to generate images based on received inputs. Behavior analysis module 122 may include components for receiving and analyzing user behavior to make useful inferences about those users. The recommendation module 132 may provide and update recommendations based on received inputs.

Users typically browse the product offerings of a business using a client device 102. For instance, client device 102 may be computer desktop, laptop, smartphone, tablet, or other suitable device for viewing product data. Product offerings may be viewed on an application running on the client device 102. Synthetic image generation system 100 depicts a web browser 104, but other applications may be used. For example, businesses may provide an application that can be downloaded in an application marketplace or app store for browsing products.

The client device 102 may be used for additional applications besides shopping. Any context in which a user desires to view customized images according to particular preferences may be supported by the methods and systems of the present disclosure. For example, the methods and systems may be used with applications for viewing artwork, education, real estate, story illustration, and so on. In some embodiments, the methods and systems of the present disclosure can be used for generating avatars, characters, and other objects in the context of gaming, virtual reality, mixed reality, and/or augmented reality applications.

In the illustrated embodiment, client device 102 receives information relating to available products from application server 106. Application server 106 may be a software or hardware program that executes program code to provide visual displays of available products for purchase. For example, application server 106 may be a web server that runs Java web archives (WARs) to provide a publicly accessible web application. Other application server 106 configurations are possible. For instance, the application server 106 may run a server-side JavaScript application or a Python application using a web-framework like Django.

Application server 106 includes components for providing an application for browsing product inventory, storage and service of assets, and for communication with other modules for parametrized generation of synthetic models and recommendations. Application server 106 may include a database 108. For example, the database 108 may be a SQL-based relational database that contains information including selected and inferred parameters, inventory and product data, inventory data, marketing copy, web application data, machine learning hyperparameters, and other information as required for execution of the application. Database 108 may be hosted on a local server or may provided by a cloud infrastructure provider, among other possible configurations. For example, database 108 may be a PostgresSQL instance hosted on Amazon Web Services.

In some other examples, saved parameters in database 108 is grouped according to certain properties of the products being viewed using client device 102 or other criteria. For instance, the certain properties may be grouped together as categories. For example, a user can have a saved set of parameters for summer clothes and a different set of saved parameters for winter clothes. The different categories of parameters may be used by client device 102 to generate synthetic models according to the classification of the product being currently viewed. In some examples, a user can save a default set of parameters that can apply to all types of products. For instance, a user may prefer a particular body size for all apparel, but only certain colors for shirts. In addition to being saved in database 108, parameters or parameter categories can be saved in web browser 104 session, cookies, local browser storage, JavaScript variables, and so on.

FIG. 1 also depicts asset storage 110. Serving of applications including multimedia assets like images, video, and audio may require the storage of those assets for use in rendered webpages. Asset storage 110 may provide assets for use by the application server 106 while rendering webpages or sending assets to the client device 102 for rendering. In some examples, database 108 may also be used in addition to or instead of asset storage 110.

Application server 106 includes a web application programming interface (API) 112 for interfacing with other components. For instance, web API 112 serves web pages to client device 102 and receives information from other modules, like generated images from the image generation module 116 using one or more endpoints. The web API 112 may use any suitable technology for inter- and intra-component communication. For instance, the web API 112 may provide Hypertext Transfer Protocol (HTTP)-based Representational State Transfer (REST) endpoints in some examples. Other supported protocols may include the Simple Object Access Protocol (SOAP), Remote Procedure Calls (RPC), Remote Method Invocation (RMI), or Graph Query Language (GraphQL), among other possibilities.

In some examples, web API 112 is used by an application running on the client device 102. For example, client device 102 may be a mobile device running an application downloaded from an app store. In that case, the web API 112 is used by the client device 102 to send and receive data from the client device 102. Application server 106 also includes application controller 114. Application controller 114 receives information from the client device 102 and modules 116, 122, 132 via web API 112. Application controller 114 may be configured to take appropriate actions based on the inputs received via the web API 112 endpoint. For example, some endpoints may be configured to store parameters in database 108 upon receipt. Other example endpoints may be configured to dispatch parameters to image generation module 116 upon request.

In some examples, the image generation module 116 is a software program that can use generative ML technology to generate images based on received inputs. For example, the image generation module 116 may receive parameters selected by a user of the client device 102 via the application server 106 that are used as a seed by a generative machine learning model 120 for generating a parameterized image.

Parameters may be any value that expresses the preference of a user of the client device and are not limited to visible or aesthetic qualities. For example, parameters may include values related to visible or aesthetic qualities like skin tone, garment color, body size, height, weight, and so on. But parameters may also include intangible qualities like mood, energy level, narrative elements, history and background, goals, among a variety of possibilities. For example, a set of visible or aesthetic parameters, in an example representation, may include, "purple," "tall," and "light brown skin tone." The same set of may include intangible qualities "high energy," "happy," "on the way home from class," and "24 years old." Because parameters may include unstructured arbitrary data, in some examples, parameters may involve free-form text description. Revisiting the previous example, unstructured parameters may include free-form text like, "I want a model that looks good in purple, is tall like me, and has light brown skin. This model should be happy and project energy, as if she is in college and is done with class for the day."

The parameters may be received in accordance with a suitable representation for generation of a synthetic image. The parameters may be received as text-based, numerical, or otherwise-encoded values. For instance, the application server 106 may send parameter selections from the client device 102 for skin tone as hexadecimal-encoded colors. One example color is "#C3967B." The image generation module 116 may contain a mapping of hexadecimal selections to natural language identifiers. In this example, "#C3967B." may map to "light brown." In some examples, the hexadecimal-encoded color may be input to the generative ML model 120. In certain embodiments, parameters may be received as unstructured input. For instance, parameters may be sent as arbitrary text.

Image generation module 116 includes a generative ML model 120. The generative ML model may utilize one or more ML technologies for the generation of synthetic models using parameterized input. The parameterized input acts as a seed for the generation of synthetic models by the generative ML model 120. In one example implementation, the generative ML model includes a generative adversarial network (GAN), but other ML algorithms may be used. For example, the generative ML model 120 may include a variational autoencoder (VAE), flow-based generative models, a diffusion model, a combination thereof, or another algorithmic approach to generation of synthetic model images.

In one example implementation, the generative ML model 120 is implemented as a text-to-image ML model. Such a model may use natural language processing (NLP) to convert a plain text prompt into a synthetic image. In some embodiments, the image generation module 116 may receive the input parameters in a particular representation and convert/combine them into a plain text prompt. For example, the image generation module 116 may receive the parameters "male," "purple sweater," "medium size," "average body type", and "light brown skin tone," using a suitable representation. The image generation module 116 may create a sentence that can be parsed by an NLP model. For example, the above parameters may result in the sentence, "a male fashion model wearing a purple sweater who has a light brown skin tone, who wears a men's medium size, and who has an average body type." The sentence can be input to the generative ML model 120 and a corresponding synthetic image can be generated. In embodiments that include unstructured, plain text parameters, such parameters can be passed directly to generative ML model 120. For example, some embodiments may accept unstructured audio or video from users that can be transcribed and passed directly to generative ML model 120.

In some embodiments, the generative ML model 120 is configured to generate partial parameterized synthetic images. For example, the model may be configured to maintain a portion of an image constant, while another portion is generated according to some inputs. For instance, the webpage provider could include a picture of a human model. The generative ML model 120 may be configured to generate a new head for the human model, while keeping the remainder of the image constant. In this way, only the head and the various parameters used to the describe the generated, synthetic head would vary, while the remainder of the image remains unchanged. This can allow for producers of marketing content to exercise a higher degree of control over the images displayed, reduce computational cost, and allow users to see less variation from one generation to the next. For example, the lighter computational cost of partial parameterized synthetic image generation may allow for some or all image generation to take place using software residing on client device 102.

Additionally, in these examples, a generative ML model 120 that is configured to generate partial parameterized synthetic images may be used for making smaller changes to cached images for faster computation. For example, upon first visiting a webpage, a user may make a number of parameter selections resulting in a new, synthetic model generation. During future visits to the webpage, the user may make few changes to parameters, requiring a smaller computational burden for generation of an updated model. In these cases, a cached or otherwise faster-loading version of the image can be used for small changes to parameters. For example, if a user changes only the color of an article of clothing or only changes skin tone by a small degree, the generative ML model 120 may operate upon the existing or cached image instead of generation of a new, synthetic model. In some examples, other digital image processing software (not shown) may be used to make small changes, in lieu of generative ML model 120.

In some embodiments, the generative ML model 120 is configured to generated parameterized synthetic outputs in other formats including graphics, photos, video, or animations, augmented reality, mixed reality, or virtual reality, among others. For example, some webpages used for marketing may provide videos of models using or demonstrating an example of the product. Upon receipt of the user's parameters, the generative ML model 120 can generate a series of synthetic images or photographs that can be combined to make a synthetic video. In another example, synthetic objects can be generated by generative ML model 120 according to specified or inferred user parameters that can be placed in an augmented or virtual reality three-dimensional space.

The generative ML model 120 is trained using training data 118. For instance, in some embodiments, the generative ML model 120 is a GAN. The GAN may include generator and discriminator neural networks. The discriminator can receive labeled training data 118 which can then be compared against the output of the generator and classified as real or generated (fake). The accuracy of those determinations is fed back into the neural networks to improve the quality of the generated images. Similar training procedures exist for other algorithmic approaches to synthetic image generation. In some embodiments, the generative ML model 120 is pre-trained in accordance with the needs of particular applications. In other embodiments, the training data 118 can be added to periodically and the generative ML model can be periodically or continuously (re-)trained. In these embodiments, the quality of the generated synthetic images can be improved based on their success in, for example, improving conversion rates. For instance, an example embodiment may learn that a particular generated image resulting from a given set of input parameters resulted in a conversion. That success can be fed back into the training process of the generative ML model 120 via the training data 118 so that subsequent images may share qualities of the image resulting in a successful conversion.

In some examples, behavior analysis module 122 includes components for receiving and analyzing user behavior to make useful inferences about those users. Behavior analysis module 122 receives user behavior information from client device 102. Behavior analysis module 122 may receive additional third-party behavior data 130 from external sources. For example, behavior data gathered by social media platforms (Facebook, Twitter, TikTok, etc.) may be available for incorporation into behavior analysis. Third-party behavior data 130 can include any relevant data for prediction of parameters. Examples include age, height, weight, race, ethnicity, skin tone, color preferences, size, body type, family details, educational details, important event data (e.g., upcoming birthdays), social media browsing data, shopping data, ad click-thru data, news, seasonal data, trending topics, and so on.

The behavior information received by the behavior analysis module 122 is reflective of the behaviors of user using the website to browse for and purchase products, or for other applications. For example, the web browser 104 may collect data while a user browses a website displaying products or images. The data may include keyboard and mouse movements, mouse or screen clicking, eye tracking, data concerning which products were viewed and for how long, location data, and viewability statistics, among others. The data gathered by web browser 104 can be send to behavior analysis module 122 along with third-party data 130 for analysis.

Behavior data is analyzed by an analysis engine 124. The analysis engine 124 may apply one or more statistical methods to the data received from client device 102 and third-party data 130 to determine behavioral metrics. For example, the behavior data may include click data. The data may be reflective of a tendency to click on products of a particular color or type. Through the application of statistical methods including, for example, a linear regression model, user behavior can be quantified into one or more metrics. In this example, the metrics may indicate a certain probability to click on a product of a particular color or a probability distribution related to several colors. Other metrics may include timing metrics, viewability metrics, spending metrics, browsing metrics, and various other quantifiable measurements of user behavior.

Results of the analyses performed by the analysis engine 124 is stored in the metric storage 126 component of behavior analysis module 122. Metric storage 126 may be a memory device included in the behavior analysis module 122. The memory device may be local hard disk storage or may be a module used for communications, storage, and retrieval from a remote location, like a cloud storage provider. The behavioral metrics may be stored, updated, queried, and deleted in metric storage 126 as needed for use by the recommendation module 132, application server 106, and image generation module 116.

For example, the image generation module 116 can use a behavioral metric as another seed for the generative ML model to generate a parameterized image. For instance, in addition to the parameters "purple" and "average body type," a behavioral metric that reflects a tendency to prefer seasonal clothes may be included in the input to a text-to-image generative ML model 120. Prior to sending the user's selected parameters to image generation module 116, application controller 114 may receive information about a behavioral metric of the user and send it, along with the selected parameters, to the image generation module 116. The behavioral metric may be included in the parameters used by the image generation module 116. For example, a behavioral metric in the example above could be output as "prefers winter clothing."

Behavior analysis module 122 includes an inference model 128. The inference model 128 may be a ML model or statistical analysis model that can infer parameters based on the behavior data or metrics received by or determined by the components of the behavior analysis module 122. For example, the inference model 128 may be an ML model that is trained to output one or more parameters given behavior data input.

Any suitable ML model may be used according to different examples, such as deep convolutional neural networks ("CNNs"); a residual neural network ("Resnet"), or a recurrent neural network, e.g. long short-term memory ("LSTM") models or gated recurrent units ("GRUs") models, a three-dimensional CNN ("3DCNN"), a dynamic time warping ("DTW") technique, a hidden Markov model ("HMM"), a support vector machine (SVM), decision tree, random forest, etc., or combinations of one or more of such techniques—e.g., CNN-HMM or MCNN (Multi-Scale Convolutional Neural Network). Further, some examples may employ adversarial networks, such as generative adversarial networks ("GANs") or may employ autoencoders ("AEs") in conjunction with ML models, such as AEGANs or variational AEGANS ("VAEGANs").

Inference model 128 can be used to compare the behavior of particular users to other users or users of related websites. For example, analysis engine 124 may receive behavior data from client device 102 about a particular user. The analysis engine 124 may also receive behavior data about other users from external third-party data 130 sources. Behavioral metrics about the particular user and the other users may be determined by the analysis engine 124.

The inference model 128 may then determine a similarity measure between the behavioral metric of the particular user and the behavioral metrics of the one or more other users. For example, the behavioral metrics may be encoded into a phase space and the similarity measure can be determined from the vectors representing the resultant encodings. The similarity measure may use the Euclidean distance between the vectors, the cosine, the dot product, or other suitable similarity metric. The inference model 128 may be trained to output one or more parameters given a similarity metric. The parameters may be used as a seed for the generation of a synthetic model by the image generation module 116 that may have a higher conversion likelihood for the one or more other users based on their similarity to the particular user. In some embodiments, image generation module 116 may receive parameters from both the behavior analysis module 122 that are inferred from one or more behaviors as well as parameters from the client device 102.

For example, inference model 128 may receive a behavioral metric for a first user that indicates a preference for the color green. The inference model 128 may receive a behavioral metric for a second user that indicates a preference for spring seasonal colors. The inference model 128 may determine a similarity measure between the first and second behavioral metrics that indicates a short distance between the two metrics, and thus a high degree of similarity. Based on that high degree of similarity, the inference model 128 may output one or more parameters for the second user that are correlated with parameters selected by the first user associated with a successful conversion. The parameters for the second user can be used by the image generation module 116 to generate an updated parameterized image using the new parameters as a seed. The image generation module 116 may receive the inferred parameters for the second user along with parameters explicitly selected by the second user for the generation of parameterized images.

In some embodiments, analysis engine 124 and inference model 128 can use time series behavior metrics determined over a period of time to optimize the inference of parameters. For example, analysis engine 124 may include a reinforcement learning model that rewards inferences made by inference model 128 over time that result in conversions or other desired outcomes. The reinforcement model, or an equivalent algorithmic approach, can establish an optimal behavior pattern that maximizes the conversion rate for a set of behavior metrics. Thus, in addition to the inferences drawn by inference model 128 from behavior metrics, the inferences can be further influenced by the solution to the optimization problem solved by the reinforcement learning model in analysis engine 124.

The reinforcement learning model can use a Markov decision process to characterize the optimization problem. The reinforcement learning model may use one or a combination of algorithms including Monte Carlo methods, Q-learning, Deep Q-Networks (DQN), Deep Deterministic Policy Gradient methods (DDPG), and/or state-action-reward-state-action (SARSA), among other suitable algorithm selections.

The recommendation module 132 provides and updates recommendations based on received inputs. Recommendation module 132 includes recommendation engine 134. Recommendation engine 134 generates recommendations for users based on all available information according to particular algorithms. Recommendation module 132 may receive data from the behavior analysis module 122, from third-party data sources 130, or directly from client device 102, among other possible sources. For example, recommendation engine may generate recommendations based on at least one of a behavioral segmentation algorithm, a content-based filtering algorithm, or a collaborative filtering algorithm.

A behavioral segmentation algorithm involves clustering groups of users based on inferred behavior patterns. The recommendation engine 134 may receive behavioral metrics from the behavior analysis module 122 and group the metrics into categories of users. The marketing strategy can be varied according to common properties of the behavioral metrics composing the categories. For example, the recommendation engine 134 may group users with observed tendencies to click on seasonal colors with users with observed tendencies to buy outdoor gear. Based on the categorization, recommendations can be further tailored to the qualities of the particular category. Behavioral segmentation algorithms may utilize machine learning models to make predictions about user choices or to classify users into categories.

A content-based filtering algorithm may be used to generate recommendations based on behaviors or explicitly communicated preferences. In contrast, collaborative-based filtering uses data both about individual users, as with content-based filters, and information about related users to generate recommendations. For example, collaborative-based filtering may use similarity measures to determine the degree of similarity between users. Behavioral segmentation algorithms, content-based filtering algorithms, and collaborative filtering algorithms may be used individually or in combination by recommendation engine 134.

In some embodiments, recommendation engine 134 may receive parameters from the client device 102 selected by a user or inferred parameters from the behavior analysis module 122 via application server 106 or historical parameters from the database 108 via application controller 114. Based on those parameters, the recommendation engine 134 may generate a second set of recommendations that is a based on a previously generated first set. The second set of recommendations may include at least one recommendation from the first set but may also include new recommendations based on the received parameters. For example, the second set of recommendations may be the first set of recommendations, re-ranked.

To this end, recommendation module 132 includes ranking engine 136. Ranking engine 136 may include a machine learning model that is trained to output a recommendation ranking that is most likely to cause a conversion, based on the ordering of the recommendations. The ordering of the recommendations may correspond to, for example, the prominence of or ordering of the recommendations on a rendered webpage. The machine learning module used in the ranking engine 136 may be trained using supervised or unsupervised training methods to predict a re-ranking that is most likely to cause a conversion.

In some embodiments, the recommendation module 132 receives parameters before making recommendations. For example, a user may visit a website served by application server 106 that receives information from a third-party 130 from which parameters may be inferred. In this example, the recommendation module 132 can receive those inferred parameters upon the user's first visit to the website and generate recommendations on the basis of those parameters.

Any suitable ML model may be used according to different examples, such as deep convolutional neural networks ("CNNs"); a residual neural network ("Resnet"), or a recurrent neural network, e.g. long short-term memory ("LSTM") models or gated recurrent units ("GRUs") models, a three-dimensional CNN ("3DCNN"), a dynamic time warping ("DTW") technique, a hidden Markov model ("HMM"), a support vector machine (SVM), decision tree, random forest, etc., or combinations of one or more of such techniques—e.g., CNN-HMM or MCNN (Multi-Scale Convolutional Neural Network). Further, some examples may employ adversarial networks, such as generative adversarial networks ("GANs") or may employ autoencoders ("AEs") in conjunction with ML models, such as AEGANs or variational AEGANS ("VAEGANs").

The synthetic image generation system 100 exemplifies some improvements to the technical field of digital marketing content generation and to systems for synthetic human model generation. In particular, marketing content creators benefit from an automated, robust, and scalable mechanism through which they can enable a user to visualize products on fashion models with attributes to their liking, expanding customer reach and improving conversion rates.

Moreover, more affordable systems may enable wider adoption of synthetic content creation platforms. Users seeking personalized experiences consistent with their own preferences may demonstrate a higher probability of purchasing products when parameterized, unique marketing content is generated to match those preferences. Additionally, highly relevant recommendations may further emphasize the attributes sought after by the user and improve conversion rates. Gathered parameter information, inferred or computed behavioral metrics, and improved recommendations may be insights that can be re-used for other activities like improving product search and fine tuning or improving the marketing pipeline. For example, inferring parameters from user behavior can allow for users to save time by not having to select parameters at all.

The ability to generate synthetic models that conform to personal preferences also improves the ability of marketers to better support the twin aims of diversity and inclusion. For example, some users may be alienated by frequent exposure to models that reflect an average but do not reflect their own demographic. Synthetic models that conform to specified parameters can allow for richer and varied diversity in a variety of aesthetic categories.

FIGS. 2A-D are illustrations of example GUI controls that may be used for the selection and input of parameters related to parameter-based synthetic model generation and recommendations. FIGS. 2A-D include example GUI controls for skin tone, ethnicity, and size, but one skilled in the art will immediately recognize that a large diversity of input parameters and associated controls may be used in addition to the ones illustrated here, including both structured and unstructured data. For example, in addition to skin tone, ethnicity, and size, other parameters of interest may include body shape, height, weight, color, mood, expression, vibe, background, lighting, time of day, posture, pose, hair color, and hair length, among others. Likewise, various types of GUI controls may be used for input of a particular parameter. For example, both a text input box and a horizontal slider could be used for input of a numerical size parameter. Skin tone, ethnicity, and size are examples of structured parameters that may be used for parameter-based generation of synthetic models.

In the example controls depicted in FIGS. 2A-D, the selection made using the GUI control corresponds to information about the selected preference of interest that may be sent to the image generation module 116. In some examples, the selection made with the GUI control may be mapped to a numerical value that is in turn mapped to a parameter at the image generation module 116. For instance, the position of a slider control in a web page may be mapped to a numerical value according to program code like hypertext markup language (HTML). Upon the operation of the control, the numerical value may be sent to the application server 106. A component of the application server 106 may include a mapping of the numerical value to a parameter that can be received by the image generation module 116. For instance, database 108 can store such a mapping and application controller 114 may be used for lookup operations. Maintenance of separate maps ensures that the implementation details of the web page remain decoupled from the image generation module 116 since the generative ML model 120 may require inputs in a different format or representation.

Figure 2A:
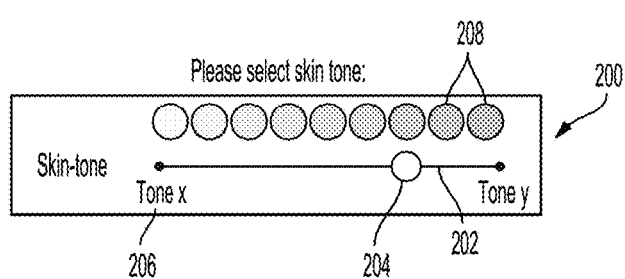
FIGS. 2A-D are illustrations of example graphical user interface ("GUI") controls that may be used for the selection and input of parameters related to parameter-based synthetic model generation and recommendations, according to some embodiments described herein.

FIG. 2A depicts a horizontal slider 200 that is used for the selection of skin tone. Slider 200 includes a continuous selection range 202 and a control handle 204. The control handle 204 can be moved along the continuous selection range 202 using a suitable input device or method including, for example, a finger on a touchscreen or a mouse connected to a desktop computer. The continuous selection range 202 may include one or more boundary values 206 representing the minimum or maximum selection possible. For instance, boundary value 206 depicts the lightest skin tone that it is possible to select using example control 200. In example horizontal slider 200, boundary value 206 is labeled "Tone x" but any suitable descriptive label may be used. Continuous selection range 202 may include one or more skin tones 208 corresponding to the skin tone that will be selected according to the position of the control handle 204. The example horizontal slider 200 features a continuous selection range, but some examples may have discrete positions that allow for a limited subset of selections. The position of the control handle 204 corresponds to information about the selected skin tone that may be sent to the image generation module 116. For example, the position of the control handle 204 may be mapped to a numerical value that is in turn mapped to a skin tone parameter at the image generation module 116. Slider 200 can be used for input of any type of parameters but is particularly useful in the case where the parameter can be expressed as one or more points of a range, gradient, scale, and the like.

Figure 2B:
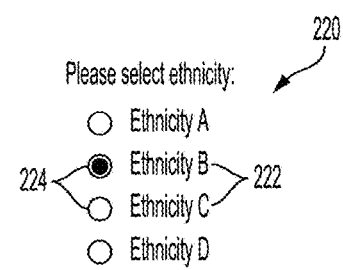

FIG. 2B depicts a radio button 220 that is used for the selection of ethnicity or other parameters. Radio button 220 includes selections 224 corresponding to ethnicities 222. In some example radio button configurations, only one option may be selected, but some embodiments may include multiple select options. For example, a user may identify as a member of both Ethnicity A and Ethnicity C. The selection 224 corresponds to information about the selected ethnicity that may be sent to the image generation module 116. For example, the selection 224 may be mapped to a numerical value that is in turn mapped to an ethnicity parameter at the image generation module 116.

Figure 2C:
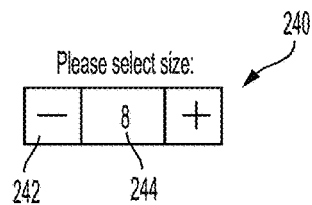

FIG. 2C depicts a text input box 240 that is used for input of an alphanumeric parameter. In the illustrated embodiment, the alphanumeric parameter represents a size, but in other embodiments could represent other types of parameters. Text input box 240 includes input box 244 that receives a manually input alphanumeric value, for example by a user using an input device like a keyboard, touchpad, touchscreen, microphone, or the like. Example text input box 240 includes increment/decrement buttons 242 for selecting or changing the alphanumeric value, for example using an input device like a touchpad, touchscreen, or mouse. In the illustrated example, the input 244 corresponds to information about the selected size that may be sent to the image generation module 116. For example, the input 244 may be mapped to a size parameter at the image generation module 116.

Figure 2D:
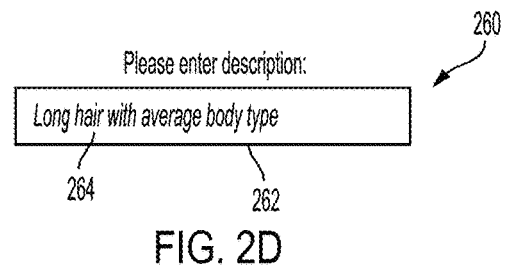

FIG. 2D depicts a text input box 260 that is used for input of unstructured data. For example, text input box 260 may include a text box 262 that can receive plain text 264 from a suitable input device. Input devices may include the keyboard, touchscreen keyboard, microphone, voice to text component, or other suitable input device. Because the plain text 264 is unstructured, it can be arbitrary.

In examples using a text-to-image generative ML model 120 that uses NLP to process incoming text-based parameters, the unstructured input received in text box 262 may be passed directly to generative ML model 120. However, accepting arbitrary text input may invoke security and safety concerns. Therefore, some application server 106 implementations may include filtering mechanisms to prevent the generation of, for example, offensive or copyrighted synthetic images or to prevent against injection attacks.

Figure 3A:
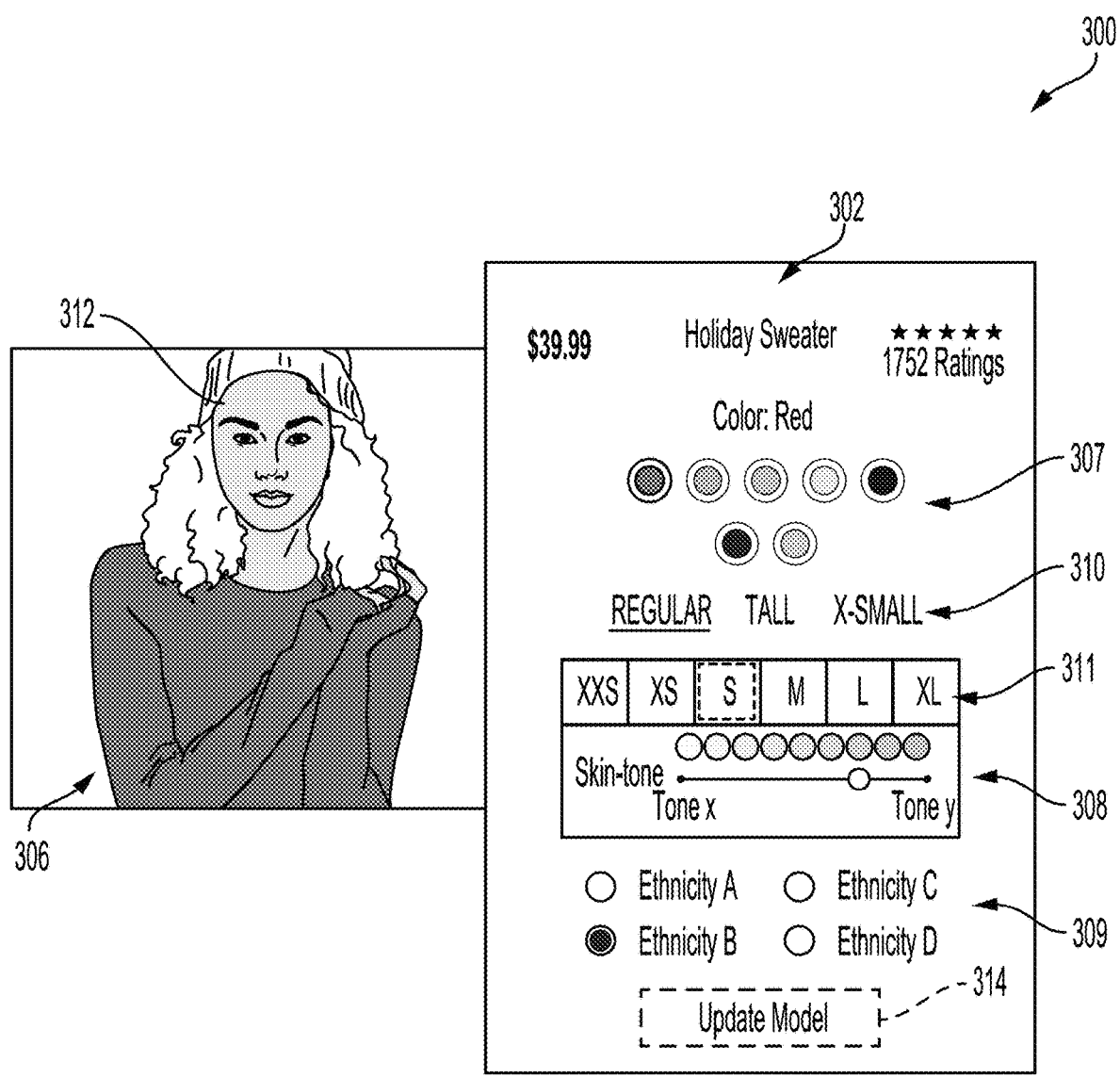
FIGS. 3A-B depict illustrations from an example user interface for parameter-based synthetic model generation and recommendations, according to some embodiments described herein.
Figure 3B:
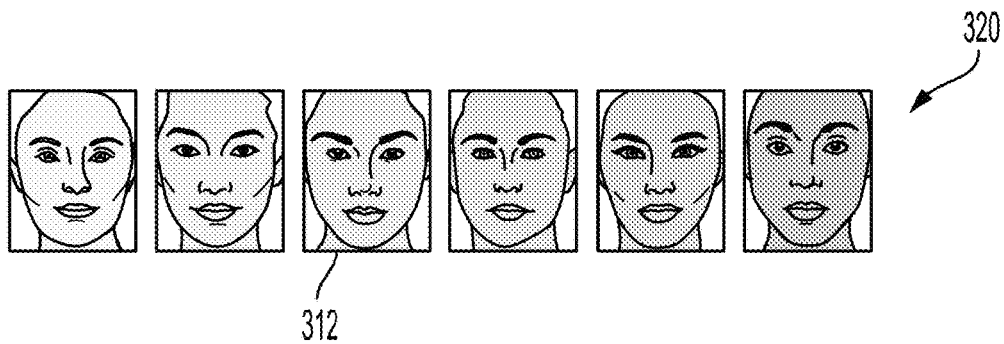

FIGS. 3A-B depict illustrations from an example user interface 300 for parameter-based synthetic model generation and recommendations. Example user interface 300 shown in FIG. 3A may be included, for example, in a product webpage but may be any kind of webpage or application display. FIG. 3 shows one possible implementation, but others are possible. For example, a similar user interface could be presented to the user upon arriving at a webpage for the first time, and the selected parameters could be saved in the user's session. Future changes could be made, in this example, in an account settings or other user interface for making updates.

Example user interface 300 includes product information 302 and product image 306. Product information 302 may include, among other possibilities, a product name, description, price, ratings, or special offers. Product image 306 may be a photograph of a human model showing the product according to default parameters. In some examples, the application server 106 can determine the identity of the user before parameters are selected and based on saved session or user data, select appropriate default parameters for that particular user. Image generation module 116 may generate a synthetic model for the user upon loading the webpage for the first time based on the user's default parameters.

Example user interface 300 includes several example controls 307, 308, 309, 310, 311 that may be selected by the user viewing the webpage that may be used as a seed by the generative ML model 120 for generation of synthetic models. Skin tone slider 308 is similar to the example control 200 discussed in FIG. 2 above. Ethnicity radio button 309 is similar to example control 220 discussed in FIG. 2 above. Example user interface 300 also includes color selector 307, body type selector 310, and size selector 311. In this example, these webpage controls may be associated using, for instance, HTML with one or more data values that map to parameters. Alternatively, the controls may map to HTML representations, or the like, which are in turn mapped to parameters readable by the image generation module 116. Such a mapping may be performed by application controller 114 or other suitable component of application server 106.

Upon selection of parameters using controls 307, 308, 309, 310, 311, the user may use update button 314 to affect generation of a synthetic model by the image generation module 116 that uses the selected parameters as seeds or input values. As shown in FIG. 3A, the update button 314 is a part of user interface 300, but other arrangements are possible. In some examples, the synthetic image is updated automatically upon adjustment of controls 307, 308, 309, 310, 311.

FIG. 3B illustrates a range of synthetic models 320 that may be generated upon pushing of the update button 314 given different selections of the skin tone slider 308. In example user interface 300, the user has selected a skin tone using skin tone slider 308. The generated synthetic model 312 corresponds to the selected skin tone and is also seen in product image 306. Thus, this illustration shows the result following the user's pushing of update button 314.

Figure 4:
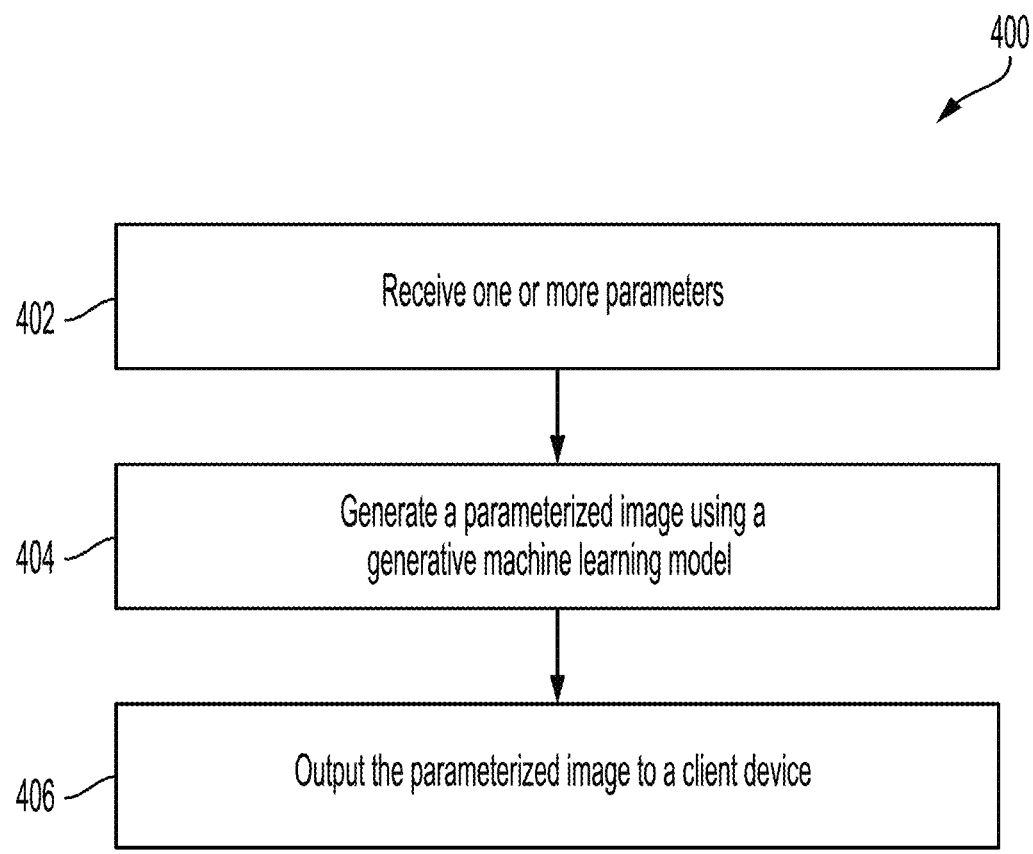
FIG. 4 is a flow diagram of an example of a process for parameter-based synthetic model generation and recommendations, according to some embodiments described herein.

FIG. 4 is a flow diagram of an example of a process 400 for parameter-based synthetic model generation and recommendations. The process 400 depicted in FIG. 4 may be implemented in software executed by one or more processing units of a computing system, implemented in hardware, or implemented as a combination of software and hardware. This process 400 is intended to be illustrative and non-limiting. The example process herein is described with reference to the example synthetic image generation system 100 depicted in FIG. 1, but other implementations are possible. Although FIG. 4 depicts various processing operations occurring in a particular order, the particular order depicted is not required. In certain alternative embodiments, the processing may be performed in a different order, some operations may be performed in parallel, or operations may be added, removed, or combined together. Some elements of process 400 may be performed, for example, by an image generation module 116.

In block 402, an image generation module 116 receives one or more parameters. For example, the parameters may be selected by a user viewing a product webpage using a user interface similar to the one illustrated in FIG. 3. Upon receiving an indication to generate an image using, for instance, the update button 314, parameter information may be sent to the image generation module 116. Parameters may also be received from the behavior analysis module 122 based on inferences made by inference model 128. For example, parameters may be inferred for a user based on their calculated similarity to another user with a demonstrated propensity to convert. In some examples, default or saved parameters may associated with a particular user using session data (e.g., cookies, local web browser storage, etc.) or stored in database 108 in association with the particular user's account.

The parameters may be sent using a representation encoded in, for example, the program code used to generate the display. For example, the parameters may be associated with numerical or other data values in HTML or associated JavaScript code used to generate a webpage. In other examples, the application server 106 may assign an identifier to the parameters or parameter ranges (e.g., for slider-type controls). Upon selection of a parameter using a user interface control, the application server 106 may use a mapping to convert the identifier to an encoding that can be used by the image generation module 116. For example, the application server 106 may use an identifier like the primary key from a database 108 table to identify a particular color, size, or skin tone. The application server 106 can convert the identifier into a format usable by the generative ML model 120, like plain text. In some examples, the parameters may be unstructured, plain text. For example, the user interface control may be a text input box that can accept arbitrary input.

The selected parameters can be saved by the application server 106 using, for instance, database 108. In some examples, selected parameters may be saved in the user's session using, for instance, cookies, JavaScript variables, or other local browser storage technology. In some other examples, saved parameters can be grouped according to certain properties of the products being viewed using client device 102. The certain properties may be identified as categories. For example, a user can have a saved set of parameters for shirts and a different set of saved parameters for pants. The different categories of parameters may be used according to a classification of product being viewed. In some examples, a user can save a default set of parameters that can apply to all types of products. For instance, a user may prefer a particular body size for all apparel, but only certain colors for shirts.

Although some examples herein have been discussed in the context of fashion or apparel, it will be apparent to one skilled in the art that the methods of the present disclosure are applicable to any context that includes a user of a client device viewing a display, who may have preferences about that display. For example, the methods of the present disclosure may be used for generation of images of customizable user goods like furniture, kitchen ware, vehicles, and food, among many other possible examples. Moreover, it should be stressed that the methods of the present disclosure are applicable outside the context of e-commerce or retail. For example, the methods of the present disclosure may be used for generation of images for educational, narrative, expositive, or argumentative purposes in addition to the examples shown herein.

In block 404, the image generation module 116, responsive to receiving the one or more parameters, generates a parameterized image using a generative ML model 120, wherein the one or more parameters are used as a seed by the generative ML model 120 for generating the parameterized image. In some examples, the generative ML model 120 may receive parameters encoded in a representation appropriate for input to the generative ML model 120. For example, the parameters may be received as plain text. The plain text parameters can be concatenated or combined to form a sentence input for a text-to-image ML model that generate a parameterized image in accordance with the sentence. For example, the plain text parameters "purple," "medium," and "slender" may be combined to form the sentence "slender model wearing a purple medium-sized sweater." In some examples, unstructured input can be combined with structured input using an NLP model.

Other parameter encodings are possible when used with other types of generation ML models 120. For example, the parameters may be encoded as coordinates in a multi-dimensional phase space that includes a dimension for each parameter type. Upon receipt of the parameters, the image generation module 116 may cause the generative ML model 120 to generate a parameterized image using the given parameters.

In addition to parameterized image, generative ML model 120 can be configured to generated parameterized synthetic outputs in other formats including graphics, photos, video, or animations, augmented reality, mixed reality, or virtual reality, among others. For example, the synthetic image can be a static image, or it can be a series of images combined to make a video or animation. Some example generative ML models may generate video or other multimedia formats directly.

In block 406, the image generation module 116, outputs the parameterized image to a client device 102. For instance, the generated parameterized image may be sent to the client device 102 via application server 106. The image generation module 116 sends the image to the application server 106, which then serves the data and assets needed to display the website. The website is accessed through a browser running on the client device 102. In some embodiments, the parameterized image may be saved by application server 106 for subsequent use. For example, in the case where a user's parameters do not vary from one impression to the next, the same parameterized image may be used for a given set of parameters. In some embodiments, image generation module 116 may be configured to generate only new portions of synthetic models. For example, a generated synthetic model may be saved following generation and then subsequently only have a new synthetic face generated based on a parameter change. However, in the event that an impression does not result in a conversion, the application server 106 may be configured to generate a new parameterized image for each new impression. Subsequent generations may incorporate parameters inferred from new learned behavior data that may increase the likelihood of a conversion.

Figure 5:
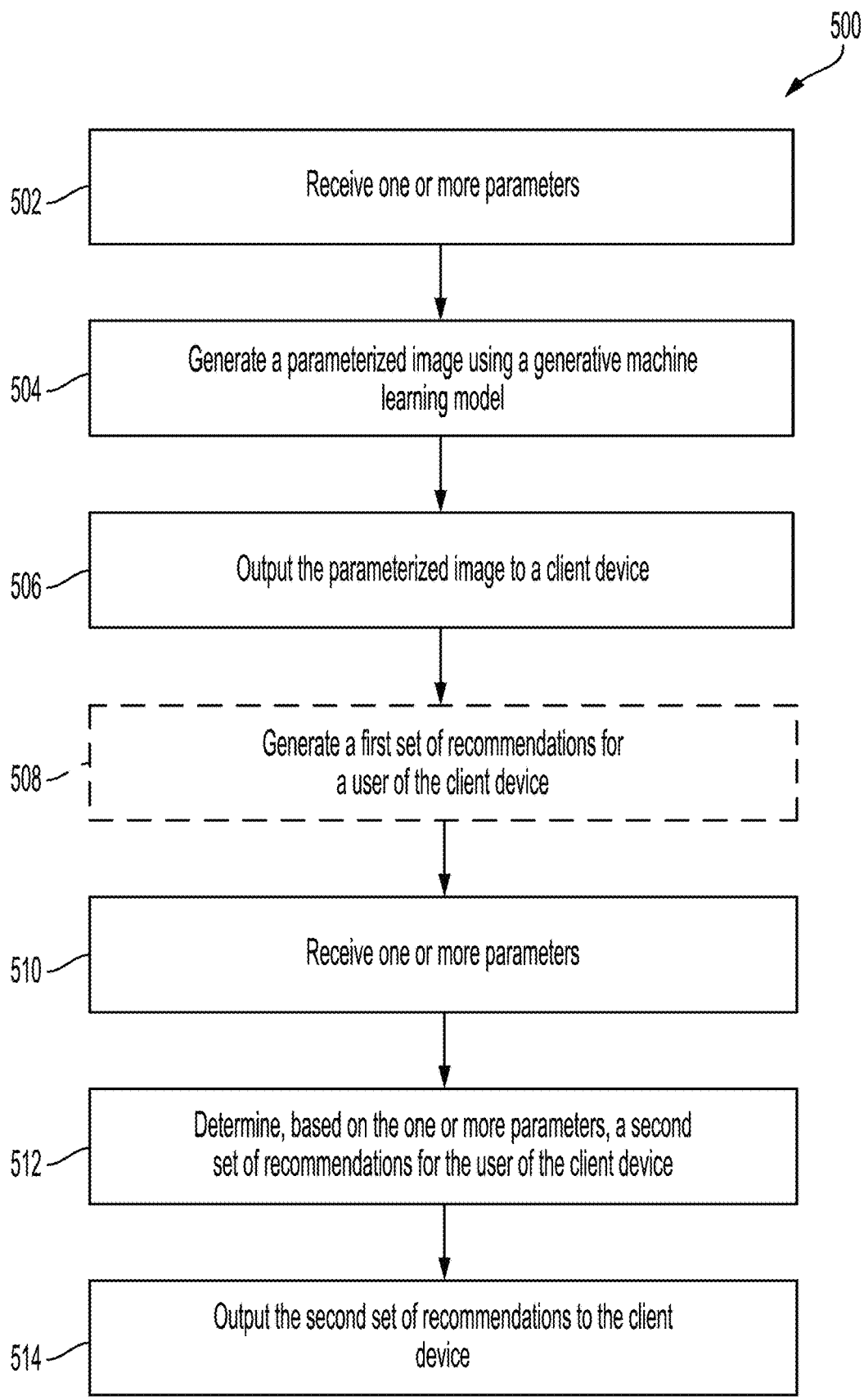
FIG. 5 is a flow diagram of an example of a process for parameter-based synthetic model generation and recommendations, according to some embodiments described herein.

FIG. 5 is a flow diagram of an example of a process 500 for parameter-based synthetic model generation and recommendations. The process 500 depicted in FIG. 5 may be implemented in software executed by one or more processing units of a computing system, implemented in hardware, or implemented as a combination of software and hardware. This process 500 is intended to be illustrative and non-limiting. The example process herein is described with reference to the example synthetic image generation system 100 depicted in FIG. 1, but other implementations are possible. Although FIG. 5 depicts various processing operations occurring in a particular order, the particular order depicted is not required. In certain alternative embodiments, the processing may be performed in a different order, some operations may be performed in parallel, or operations may be added, removed, or combined together. Some elements of process 500 may be performed, for example, by a recommendation module 132.

In blocks 502, 504, and 506, the operations including receiving one or more parameters, generating a parameterized image using a generative ML model, and outputting the parameterized image to a client device 102 are performed as described in FIG. 4.

In optional block 508, the recommendation module 132 generates a first set of recommendations for a user of the client device 102. For example, a user may use a web browser 104 to navigate to a webpage including a product for sale or display. While serving the webpage to the web browser 104, application server 106 may receive a first set of recommendations from the recommendation module 132. In general, recommendations can be based on at least a combination of behavioral segmentation algorithms, content-based filtering algorithms, or collaborative filtering algorithms. The first set of recommendations may be a default set of recommendations in the absence of additional information about the user. In that case, content-based filtering algorithm may be used to display similar items.

The first set of recommendations may also be based on known or inferred data about the user. For example, the recommendation module 132 can receive behavior information about the user from the behavior analysis module 122, data from third-parties 130, data from the user's web browser 104 session (e.g., cookies or local storage), or saved data relating to a logged-in user's account, among other possible sources of information. The application server 106, while rendering the webpage, may incorporate the first recommendations in such a way that their prominence or ordering reflects a prediction for which recommendations are most likely to result in a conversion or other desired outcome.

Block 508 is optional because in some embodiments, the recommendation module 132 can receive parameters before making recommendations. For example, a user may visit a website served by application server 106 that receives information from a third-party 130 from which parameters may be inferred. In this example, the recommendation module 132 can receive those inferred parameters upon the user's first visit to the website and generate recommendations on the basis of those parameters as described in the description of blocks 510 and 512 below.

In block 510, the recommendation module 132 receives the one or more parameters. For example, a user of client device 102 may select one or more options on the webpage corresponding to parameters. A product display may allow for selection of color or size. Likewise, a product modeled by a human model or synthetic human model may allow for the selection of traits like skin tone, ethnicity, body type, and so on. The user may make these selections using web browser 104 or other suitable application, which may be sent to recommendation module 132.

In some cases, the parameter information may be sent using a representation based on identifiers in the webpage, like HTML numerical ids or data in local web browser storage. These identifiers may, in turn, be stored in database 108 or in a component of the recommendation module 132 for mapping to a representation that can be used for the generation of additional recommendations, similar to the mapping performed by the image generation module 116. In some examples, these identifiers or other suitable representation of user selected or inferred parameters may be stored in the database 108 from previous interactions. For example, a user can be identified based on session information or login information, and their known parameter information can be looked up in database 108 using an appropriate user identifier.

In some examples, the parameter information may include, in addition to the parameters used to create synthetic images, graphical data. For example, recommendation module 132 can receive graphical data relating to recent browsing data, items viewed, clicked on links, merchandise purchased, etc. and infer one or more parameters from the graphical data. The inferred parameters can then used by the recommendation module 132 as described below.

In block 512, the recommendation module 132 determines, based on the one or more parameters, a second set of recommendations for the user of the client device. For instance, the second set of recommendations may be the same set of recommendations, re-ranked by, for example, the ranking engine 136. However, the second set of recommendations may include less or more elements, and the ordering can vary according to suitable algorithms for improving conversion rates. The recommendation engine 134 or the ranking engine 136 may include an ML model for making predictions about improved conversion rates based on particular recommendations or ordering (ranking) thereof.

In block 514, the recommendation module 132 outputs the second set of recommendations to the user of the client device. The second set of recommendations may be sent via, for instance, the application server 106 to the client device 102. For example, the client device 102 may request a webpage from the application server 106, which responds with the data and assets making up the webpage, including the second set of recommendations. The application server 106 or the client device 102 may display the second set of recommendations such that their prominence or ordering reflects a prediction for which recommendations are most likely to result in a conversion or other desired outcome. For example, in a web browser 104 displaying the first set of recommendations, the second set of recommendations may replace the first set. The application server 106 may cause an automatic refresh of the page so that the second set of recommendations are displayed. In another example, the client device 102 may run an application for displaying products or images. The second set of recommendations may be supplied to the application via the web API 112 and may be replace or supplement existing displays of recommendations. As mentioned above, display of the first set of recommendations is optional. Thus, in some embodiments, only the second set of recommendations is displayed on the client device 102, based on selected or inferred parameters.

Figure 6:
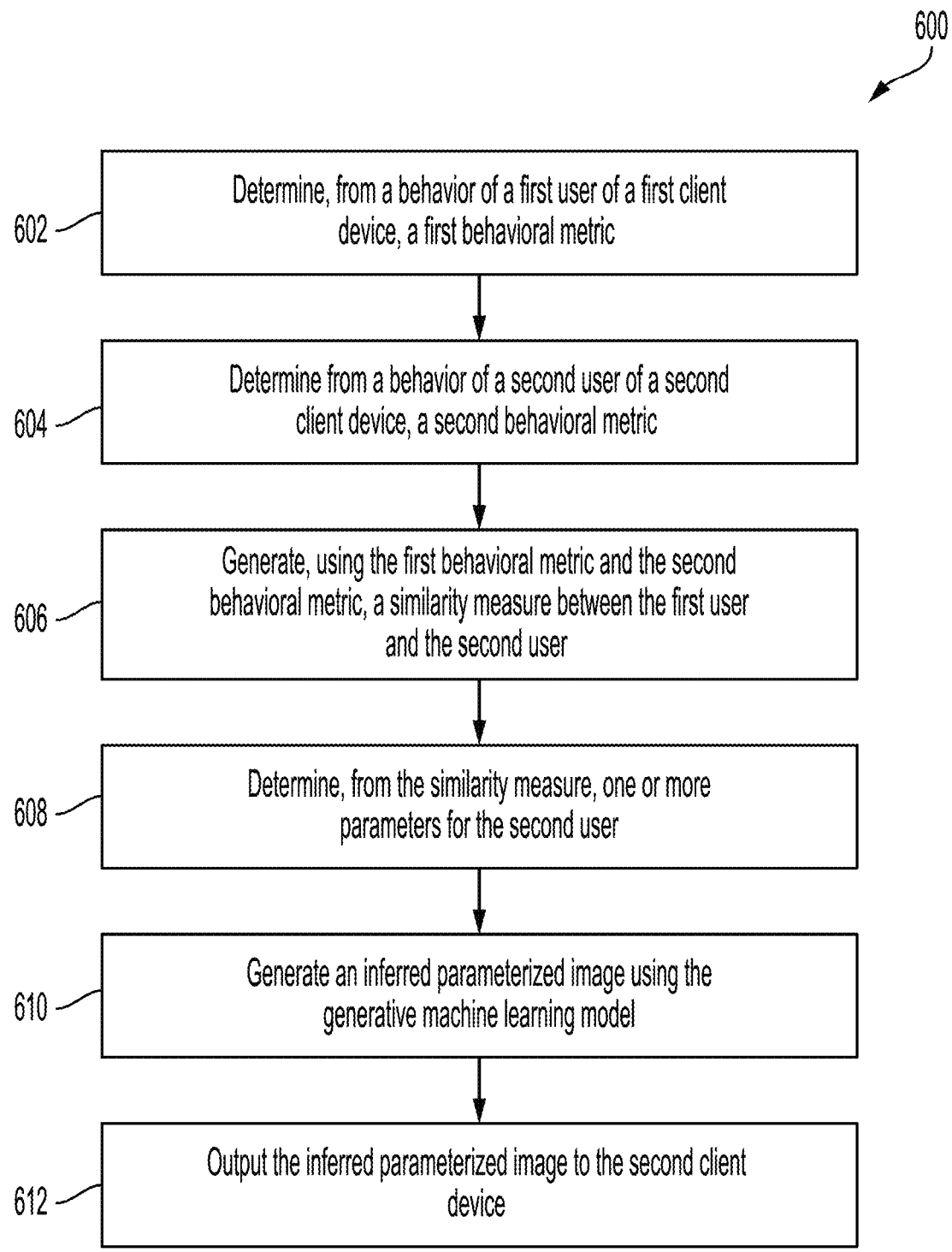
FIG. 6 is a flow diagram of an example of a process for parameter-based synthetic model generation and recommendations, according to some embodiments described herein.

FIG. 6 is a flow diagram of an example of a process 600 for parameter-based synthetic model generation and recommendations. The process 600 depicted in FIG. 6 may be implemented in software executed by one or more processing units of a computing system, implemented in hardware, or implemented as a combination of software and hardware. This process 600 is intended to be illustrative and non-limiting. The example process herein is described with reference to the example synthetic image generation system 100 depicted in FIG. 1, but other implementations are possible. Although FIG. 6 depicts various processing operations occurring in a particular order, the particular order depicted is not required. In certain alternative embodiments, the processing may be performed in a different order, some operations may be performed in parallel, or operations may be added, removed, or combined together. Some elements of process 600 may be performed, for example, by a behavior analysis module 122.

In block 602, the behavior analysis module 122 determines, from a behavior of a first user of a first client device, a first behavioral metric. The behavior analysis module 122 may receive information about the behavior of the first user from a variety of sources. For example, the behavior of the first user may be reflected in data explicitly gathered by the client device 102 or in third-party behavior data 130 received from external sources, among other sources of behavioral data.

From this behavioral data, a behavioral metric may be determined. For example, a statistical method or machine learning model may be applied to the behavioral data to make a classification, determine clustering characteristics, determine regression coefficients, and so on. In some examples, the applied methods may determine metrics that are previously identified. For instance, a classification algorithm may be used to determine a color preference based on behavioral data, like clicking or purchase habits. In some other examples, metrics may be determined using methods that are not linked with known metric outcomes. For example, a clustering algorithm may be used in concert with a similarity measure to identify similar user behaviors that may not accord to any particular description. Likewise, in block 604, the behavior analysis module 122 can determine, from a behavior of a second user of a second client device, a second behavioral metric.

In block 606, the behavior analysis module 122 generates, using the first behavioral metric and the second behavioral metric, a similarity measure between the first user and the second user. Generation of a similarity measure can be used to group similar behavioral patterns that may be amenable to comparable persuasive strategies. For example, the behavioral metrics may be encoded into a phase space and the similarity measure can be determined from the vectors representing the resultant encodings. The similarity measure may use the Euclidean distance between the vectors, the cosine, the dot product, or other suitable similarity metric. Certain algorithms may include minimization or maximization of these similarity measures, which can indicate similar behavioral patterns.

In block 608, the behavior analysis module 122 determines, from the similarity measure, one or more parameters for the second user. For example, the behavior analysis module 122 may include an ML model that can be trained to output one or more parameters given a similarity measure and one or more behavioral metrics. Training in this case may be supervised training, including labeled examples that map behaviors to parameters. For instance, a behavioral metric showing a tendency to prefer spring seasonal colors may lead to predictions of parameters like "yellow," "sun," "energy," and "flowers." In that example, the training data may include labeled example behavioral metrics that are associated with the relevant parameters.

In block 610, the image generation module 116 generates an inferred parameterized image using the generative machine learning model, wherein the one or more parameters for the second user are used as a second seed for the generative machine learning model to generate the inferred parameterized image for the second user. In some embodiments, image generation module 116 may receive parameters from both the behavior analysis module 122 that are inferred from one or more behaviors as well as parameters from the client device of the second user.

In block 612, the image generation module 116 output the inferred parameterized image to the second client device. For instance, the generated inferred parameterized image may be sent to the client device of the second user via application server 106. For example, the client device 102 may request a webpage from the application server 106, which responds with the data and assets making up the webpage, including the inferred parameterized image. In some embodiments, the inferred parameterized image may be saved by application server 106 for subsequent use. For example, in the case where a user's parameters do not vary from one impression to the next, the same parameterized image may be used for a given set of parameters. However, in the event that an impression does not result in a conversion, the application server 106 may be configured to generate a new inferred parameterized image for each new impression. Subsequent generations may incorporate parameters inferred from new learned behavior data that may increase the likelihood of a conversion.

Figure 7:
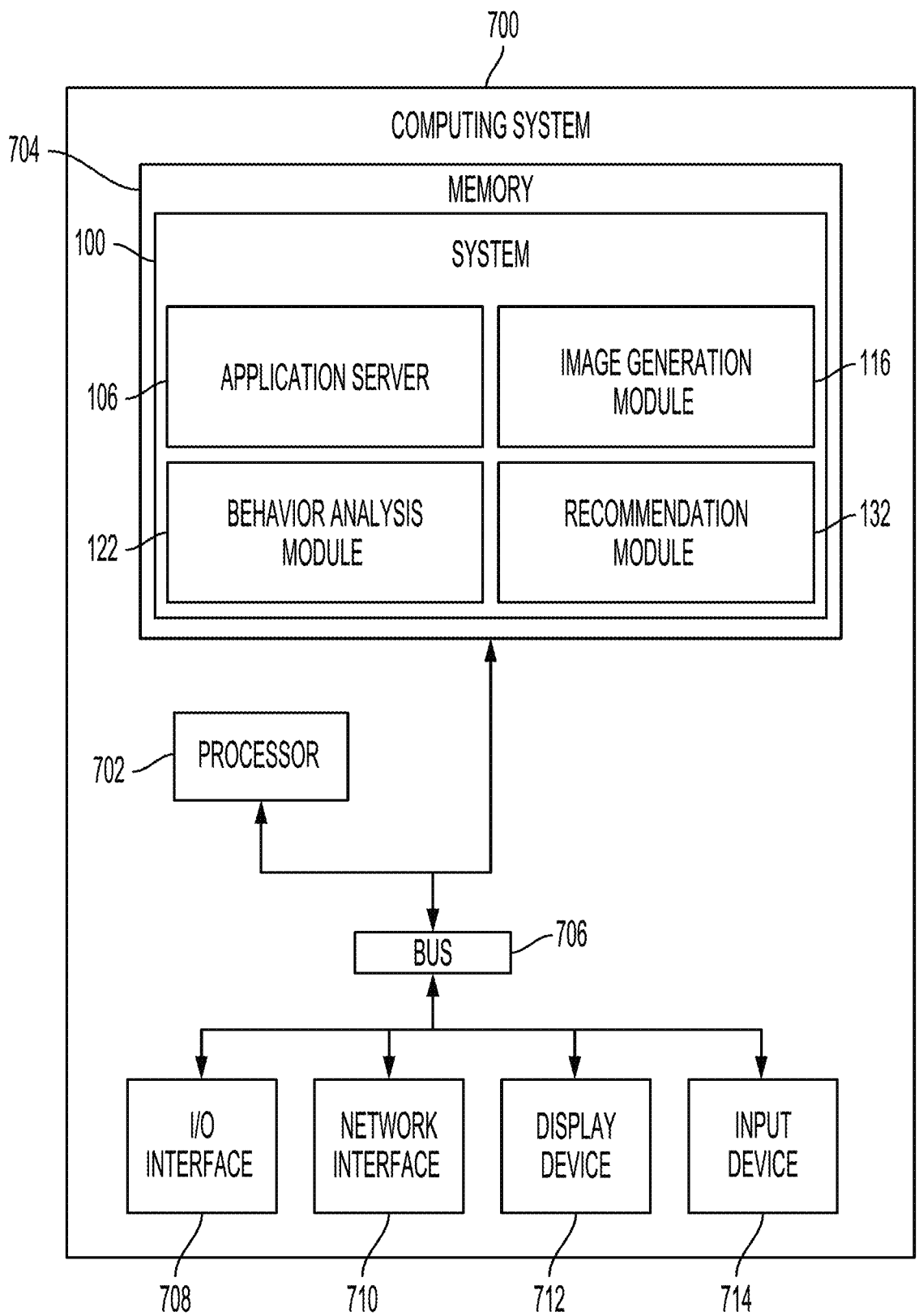
FIG. 7 is a diagram of an example of a computing system for performing certain operations described herein, according to some embodiments described herein.

FIG. 7 is a diagram of an example of a computing system 700 for performing certain operations described herein, according to some embodiments. A suitable computing system or group of computing systems can be used for performing the operations described herein. For example, FIG. 7 depicts an example of a computing system 700 that can implement the synthetic image generation system 100, including at least an image generation module 116, a behavior analysis module 122, a recommendation module 132, or various other components described herein. In some embodiments, one or more modules of the computing system 700 may be implemented in an additional computing system having devices similar to those depicted in FIG. 7 (e.g., a processor, a memory, etc.). For example, the application server 106 may be provided by a cloud computing platform while the image generation module 116, the behavior analysis module 122, and/or the recommendation module 132 are hosted on other remote servers.

The depicted example of a computing system 700 includes a processor 702 communicatively coupled to one or more memory devices 704. The processor 702 executes computer-executable program code stored in a memory device 704, accesses information stored in the memory device 704, or both. Examples of the processor 702 include a microprocessor, an application-specific integrated circuit ("ASIC"), a field-programmable gate array ("FPGA"), or any other suitable processing device. The processor 702 can include any number of processing devices, including a single processing device.

The memory device 704 includes any suitable non-transitory computer-readable storage medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 700 may also include a number of external or internal devices, such as input or output devices. For example, the computing system 700 is shown with one or more input/output ("I/O") interfaces 708. An I/O interface 708 can receive input from input devices or provide output to output devices. One or more buses are also included in the computing system 700. The bus 706 communicatively couples one or more components of the computing system 700.

The computing system 700 executes program code that configures the processor 702 to perform one or more of the operations described herein. The program code may include, for example, image generation module 116, the behavior analysis module 122, the recommendation module 132, other components of synthetic image generation system 100, or applications that perform one or more operations described herein. The program code may be resident in the memory device 704 or any suitable computer-readable medium and may be executed by the processor 702 or any other suitable processor.

The computing system 700 can access other models, datasets, or functions of the synthetic image generation system 100 in any suitable manner. In some embodiments, some or all of one or more of these models, datasets, and functions are stored in the memory device 704 of a computing system 700, as in the example depicted in FIG. 7. In some embodiments, one or more components of the synthetic image generation system 100 may be stored on a separate computing system, and the synthetic image generation system 100 can provide access to necessary models, datasets, and functions as needed. For instance, the image generation module 116 or some components thereof may be operated on a separate computing system. In additional or alternative embodiments, one or more models, datasets, and functions described herein are stored in one or more other memory devices accessible via a data network.

The computing system 700 also includes a network interface device 710. The network interface device 710 includes any device or group of devices suitable for establishing a wired or wireless data connection to one or more data networks. Non-limiting examples of the network interface device 710 include an Ethernet network adapter, a modem, and the like. The computing system 700 is able to communicate with one or more other computing devices via a data network using the network interface device 710.

The computing system 700 also includes a display device 712. The display device 712 includes any device or group of devices suitable for operation of the components of the synthetic image generation system 100. For example, display device 712 may be used to provide an administration console for operation and maintenance of application server 106. Other aspects of the synthetic image generation system 100 may also be displayed on the display device 712. Examples of the display device 712 include a computer monitor, a laptop screen, a tablet screen, or a smartphone screen.

The computing system 700 also includes an input device 714. The input device 714 includes any device or group of devices suitable for operation of the synthetic image generation system 100 according to output from the display device 712. Examples of the input device 714 include a keyboard, mouse, tablet screen, or smartphone screen.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example and explanation rather than limitation, and does not preclude the inclusion of such modifications, variations, and/or additions to the present subject matter as would be readily apparent to one of ordinary skill in the art.

The invention claimed is:

1. A computer-implemented method comprising:
   receiving, by an image generation module, one or more parameters from a client device, the one or more parameters characterizing a subject displayed on the client device;
   responsive to receiving the one or more parameters, generating, by the image generation module, a parameterized image of the subject using a generative machine learning model, wherein the one or more parameters are used as a seed by the generative machine learning model for generating the parameterized image of the subject;
   outputting, by the image generation module, the parameterized image of the subject for display to the client device;
   generating, by a recommendation module, a first set of recommendations for a user of the client device, the first set of recommendations based on at least the subject;
   receiving, by the recommendation module, the one or more parameters;
   determining, by the recommendation module, based on the one or more parameters and the subject, a second set of recommendations for the user of the client device; and
   outputting, by the recommendation module, the second set of recommendations to the client device.

2. The method of claim 1, wherein the one or more parameters includes a parameter selected by the user of the client device.

3. The method of claim 1, wherein the one or more parameters includes a parameter generated by a machine learning model and inferred from a behavior of the user of the client device.

4. The method of claim 3, wherein the second set of recommendations is determined using at least one of a behavioral segmentation algorithm, a content-based filtering algorithm, or a collaborative filtering algorithm.

5. The method of claim 3, wherein the first set of recommendations for the user of the client device are based on the behavior of the user of the client device.

6. The method of claim 3, wherein the first set of recommendations is ranked by the recommendation module; and
   wherein determining the second set of recommendations comprises re-ranking, by the recommendation module, the first set of recommendations based on the one or more parameters.

7. The method of claim 1, wherein the one or more parameters includes a first parameter selected by the user of the client device and a second parameter generated by a machine learning model and inferred from a behavior of the user of the client device.

8. The method of claim 1, further comprising:
   determining, by a behavior analysis module, from a behavior of the user of the client device, a behavioral metric of the user; and
   inferring, by the behavior analysis module, from the behavioral metric, an inferred parameter; and
   wherein the image generation module uses the inferred parameter as another seed for the generative machine learning model to generate the parameterized image.

9. The method of claim 1, further comprising:
   determining, by a behavior analysis module, from a behavior of a first user of a first client device, a first behavioral metric;
   determining, by the behavior analysis module, from a behavior of a second user of a second client device, a second behavioral metric;
   generating, by the behavior analysis module, using the first behavioral metric and the second behavioral metric, a similarity measure between the first user and the second user;
   determining, by the behavior analysis module, from the similarity measure, one or more parameters for the second user;
   generating, by the image generation module, an inferred parameterized image using the generative machine learning model, wherein the one or more parameters for the second user are used as a second seed for the generative machine learning model to generate the inferred parameterized image; and
   outputting, by the image generation module, the inferred parameterized image for display to the second client device.

10. The method of claim 1, further comprising:
    determining, by a behavior analysis module, from a first behavior of the user of the client device, a first behavioral metric;
    determining, by the behavior analysis module, from a second behavior of the user of the client device, a second behavioral metric;
    determining, by the behavior analysis module and using a reinforcement learning model, a behavior pattern from the first behavioral metric and the second behavioral metric;
    determining, by the behavior analysis module, from the behavior pattern, one or more parameters for the user;
    generating, by the image generation module, an inferred parameterized image using the generative machine learning model, wherein the one or more parameters for the user are used as a second seed for the generative machine learning model to generate the inferred parameterized image; and
    outputting, by the image generation module, the inferred parameterized image to the client device.

11. A synthetic image generation system comprising:
    an image generation module configured to:

receive one or more parameters from a client device, the one or more parameters characterizing a subject displayed on the client device;

responsive to receive the one or more parameters, generate a parameterized image of the subject using a generative machine learning model, wherein the one or more parameters are used as a seed by the generative machine learning model for generating the parameterized image of the subject; and output the parameterized image of the subject for display to the client device; and a recommendation module configured to:

generate a first set of recommendations for a user of the client device, the first set of recommendations based on at least the subject;

receive the one or more parameters;

determine, based on the one or more parameters and the subject, a second set of recommendations for the user of the client device; and output the second set of recommendations to the client device.

12. The synthetic image generation system of claim 11, wherein the one or more parameters includes a parameter selected by the user of the client device.

13. The synthetic image generation system of claim 11, wherein the one or more parameters includes a parameter generated by a machine learning model and inferred from a behavior of the user of the client device.

14. The synthetic image generation system of claim 11, wherein the one or more parameters includes a first parameter selected by the user of the client device and a second parameter generated by a machine learning model and inferred from a behavior of the user of the client device.

15. The synthetic image generation system of claim 11, wherein the synthetic image generation system further comprises a behavior analysis module configured to:

determine from a behavior of the user of the client device, a behavioral metric of the user; and infer, from the behavioral metric, an inferred parameter; and wherein the image generation module uses the inferred parameter as another seed for the generative machine learning model to generate the parameterized image.

16. The synthetic image generation system of claim 11, wherein the synthetic image generation system further comprises a behavior analysis module configured to:

determine, from a behavior of a first user of a first client device, a first behavioral metric;

determine, from a behavior of a second user of a second client device, a second behavioral metric;

generate, using the first behavioral metric and the second behavioral metric, a similarity measure between the first user and the second user;

determine, from the similarity measure, one or more parameters for the second user; and wherein the image generation module is further configured to:

generate an inferred parameterized image using the generative machine learning model, wherein the one or more parameters for the second user are used as a second seed for the generative machine learning model to generate the inferred parameterized image; and output the inferred parameterized image to the second client device.

17. A non-transitory computer-readable storage medium including instructions configured to cause one or more processing devices to perform actions including:

receiving one or more parameters from a client device, the one or more parameters characterizing a subject displayed on the client device;

responsive to receive the one or more parameters, generating a parameterized image of the subject using a generative machine learning model, wherein the one or more parameters are used as a seed by the generative machine learning model for generating the parameterized image of the subject;

outputting the parameterized image of the subject for display to the client device;

generating a first set of recommendations for a user of the client device, the first set of recommendations based on at least the subject;

receiving the one or more parameters;

determining, based on the one or more parameters, a second set of recommendations for the user of the client device and the subject; and outputting the second set of recommendations to the client device.

18. The non-transitory computer-readable medium of claim 17, wherein the one or more parameters includes a parameter selected by the user of the client device.

19. The non-transitory computer-readable medium of claim 17, wherein the one or more parameters includes a parameter generated by a machine learning model and inferred from a behavior of the user of the client device.

20. The non-transitory computer-readable medium of claim 17, further including the actions:

determining from a behavior of a first user of a first client device, a first behavioral metric;

determining from a behavior of a second user of a second client device, a second behavioral metric;

generating using the first behavioral metric and the second behavioral metric, a similarity measure between the first user and the second user;

determining from the similarity measure, one or more parameters for the second user;

generating an inferred parameterized image using the generative machine learning model, wherein the one or more parameters for the second user are used as a second seed for the generative machine learning model to generate the inferred parameterized image; and outputting the inferred parameterized image to the second client device.

* * * * *